United States Patent [19]

Barto

[11] Patent Number: 4,488,403
[45] Date of Patent: Dec. 18, 1984

[54] RECIPROCATING THERMAL ACTUATOR
[76] Inventor: John A. Barto, 3416 Croydon Rd., Baltimore, Md. 21207
[21] Appl. No.: 470,578
[22] Filed: Feb. 28, 1983
[51] Int. Cl.³ .............................................. F03G 7/06
[52] U.S. Cl. .................................................... 60/530
[58] Field of Search .......................... 60/527, 530, 531
[56] References Cited
U.S. PATENT DOCUMENTS
4,220,006 9/1980 Kindt .................................... 60/527

Primary Examiner—Allen M. Ostrager
Attorney, Agent, or Firm—John F. McClellan, Sr.

[57] ABSTRACT

A reciprocating thermal actuator system with hydraulic coupling to hydraulic motion output such as a motor is powered through cooling or alternatively heating of a thermally expansible liquid contained within respective chambers of ring shaped cross section, the heating and cooling provisions being integral with the unit and adaptable for either natural or artificial heating and cooling; details of a thermal switch in two embodiments, and of an electrical system synchronizing the heating are disclosed.

11 Claims, 10 Drawing Figures

4,488,403

RECIPROCATING THERMAL ACTUATOR

CROSS REFERENCE TO RELATED APPLICATIONS

Cross reference is made to my co-pending applications for U.S. patent Ser. No. 338,285 filed on Jan. 11, 1982, for "Reciprocating Thermal Actuator with Hydraulic Multiplier," which will issue on Mar. 1, 1983 as U.S. Pat. No. 4,375,152; and Ser. No. 338,287 filed on Jan. 11, 1982 for Hybrid Pressure Hydraulic Turbine.

FIELD OF THE INVENTION

This invention relates generally to power plants and specifically to reciprocating power plants.

BACKGROUND OF THE INVENTION

Perhaps never before in the history of the world and certainly not in the history of the United States has a need for new sources of power appeared with such urgency.

According to some estimates, world oil supplies will become exhausted within the next twenty to thirty years. Past political and economic crises over oil will predictably pale if this occurs without the substitution of other energy sources.

OBJECTS OF THE INVENTION

A principal object of this invention is to provide an improved system for energy generation of the general type disclosed in my aforesaid applications.

Further objects are to provide a system as described which is efficient, economical, reliable and which can use unchanged widely available and practically untapped natural phenomena for all or part of the energy generating cycle.

Still further objects are to provide a system as described which is practically non-polluting and noise free, which is simple, safe and easy to build and to operate, and which is adaptable to embodiment in a wide range of sizes.

Yet further objects are to provide a system as described which requires only a few parts which are easily assembled by unskilled people and which can be operated under primitive conditions of use so that it is suitable for employment in vast areas of the world where power plants are few or non-existent.

BRIEF SUMMARY OF THE INVENTION

In brief summary given as cursory description only, and not as limitation, the invention includes improvements in a thermally actuated linear motion generator of the type previously disclosed by this inventor, with integral heating and cooling means, and a hydraulic coupling system suitable for powering the hydraulic turbine disclosed by this inventor in an earlier application.

DETAILED DESCRIPTION

Figure 1:
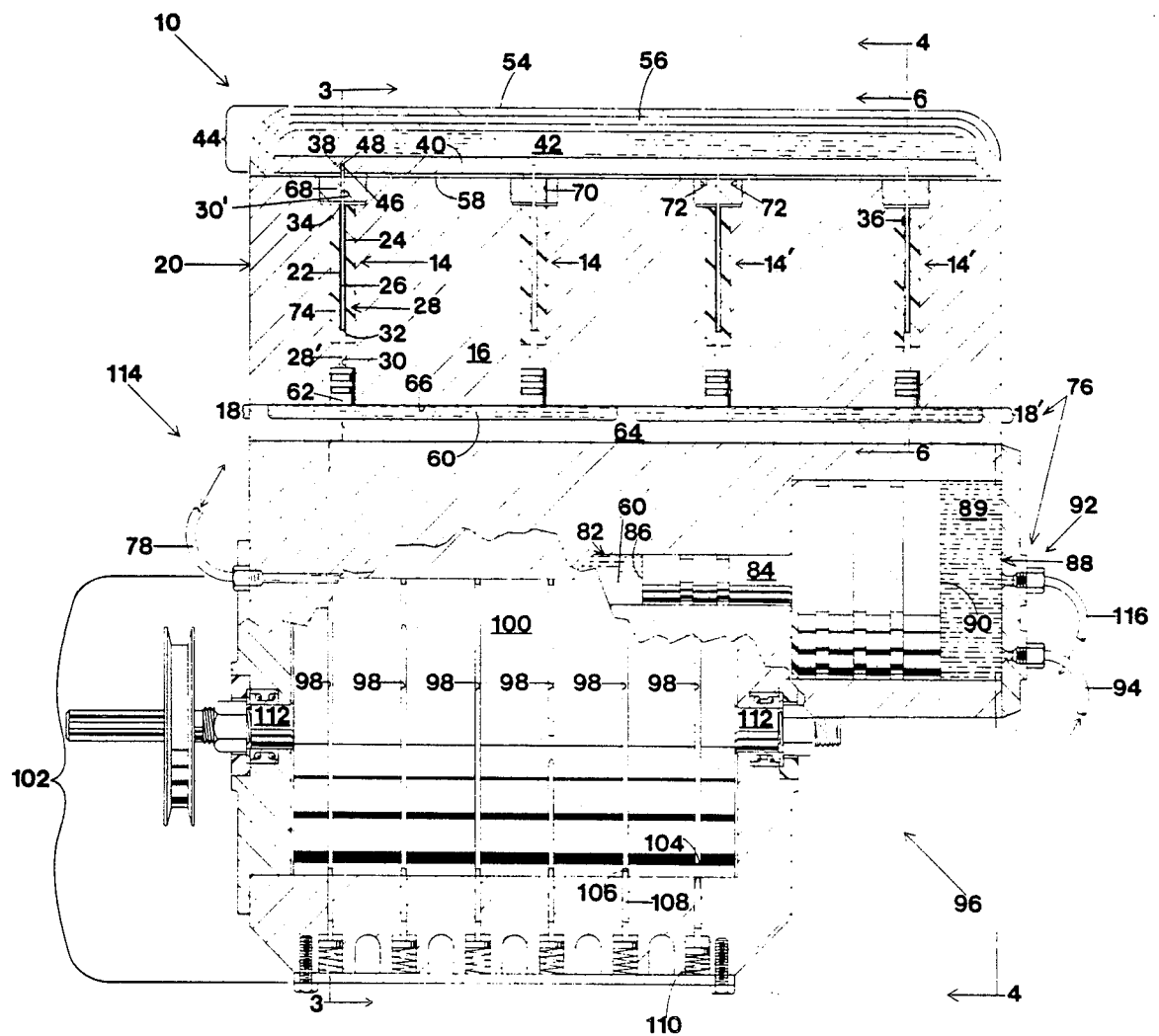
FIG. 1 is a longitudinal, partly sectional diagram of a preferred embodiment of the invention as a whole, showing actuation means, coupling means, and means for output by the inventor's hydraulic turbine.

FIG. 1: Thermal Actuation Subsystem 20

FIG. 1 shows details of a simple embodiment 10 of the invention. The invention employs four bodies of fluid; (1) a first liquid 22, which is a thermally substantially expansible liquid; (2) a second liquid 60, which is a primary hydraulic fluid in a primary hydraulic circuit; (3) a third liquid 89, which is a secondary hydraulic fluid in a secondary hydraulic circuit; and (4) a coolant fluid 42. The heart of this system is a plurality of thermal actuators 14 and 14', in spaced parallel alignment in upper block portion or housing 16 and communicating in sets at one end with a plurality of hydraulic reservoirs 18 and 18'.

Figure 6:
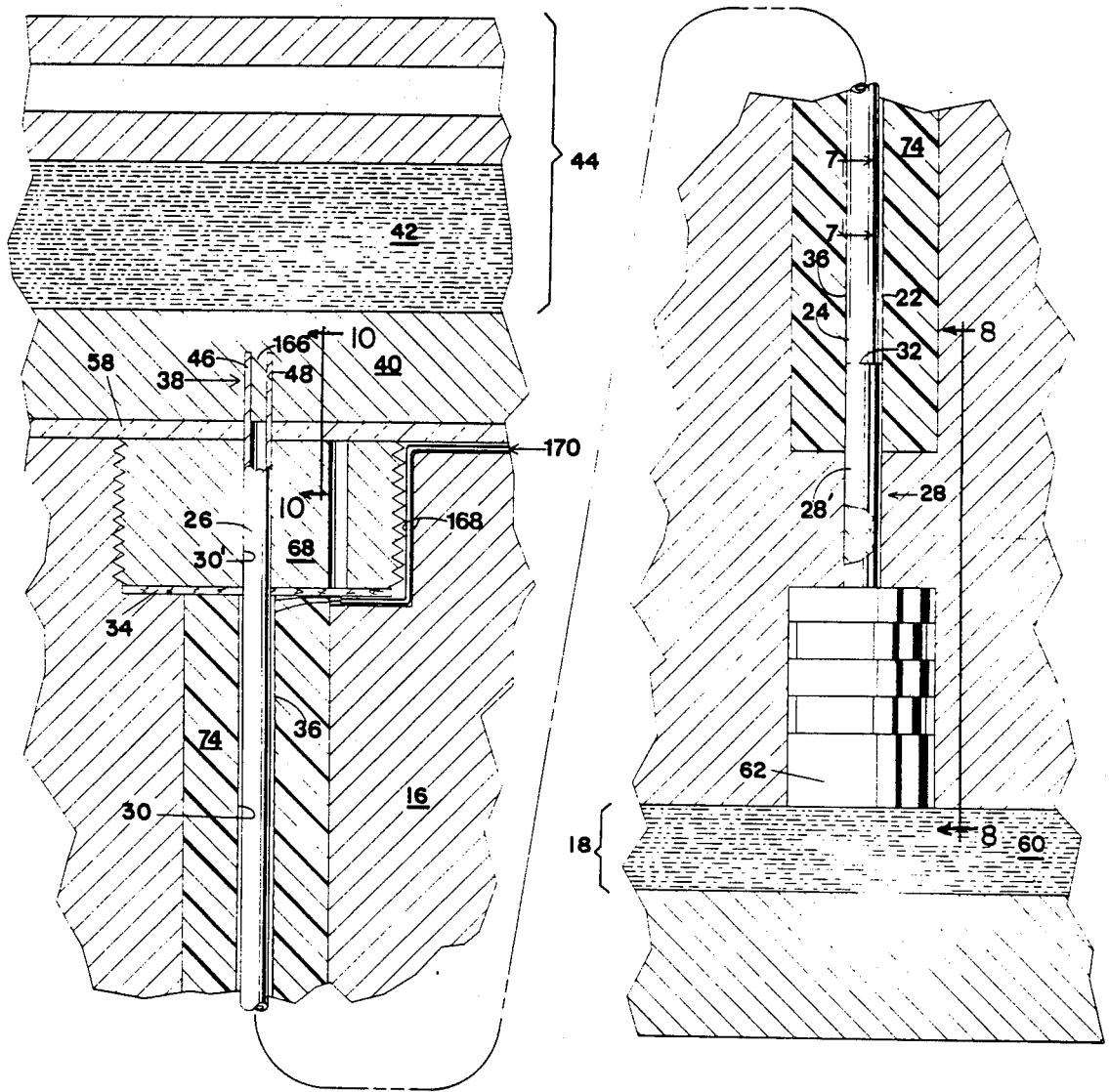
FIG. 6 is an enlarged, fragmentary sectional detail, viewed at 6—6, FIG. 1.

A thermally expansible liquid first liquid 22, for example water (see FIG. 6 for enlarged view), is hermetically contained within each of the plurality of expansion chambers 24 (see FIG. 6 for enlarged view). This apparatus operates cyclically between a heated state and a cooled state to produce expansion of the thermally expansible liquid. As in the case of water, this liquid may be expanded by cooling to the freezing point, producing expansion, and then heated, or it may be expanded by heating and then cooled. In either case, the invention will operate, but for purposes of exposition, expansion by freezing of water will be described as the mode of operation. The thermally expansible liquid may be water, or any suitable liquid which changes volume with temperature change.

Each expansion chamber 24 is, as will be seen in reference to FIG. 6, a preferably coaxial passage around the uniform diameter reduced section or first end 26, or first end, of shouldered double acting piston 28 within the first bore portion 30 housing that portion of the piston, and terminates at the first end at coaxial shoulder 32 of the piston and at the second end at a gasket seal 34. The shouldered double acting piston second end 28' comprises the larger diameter portion of 28 from the shoulder 32 to a terminal piston face. When water is employed as the thermally expansible liquid, a power stroke occurs upon freezing, and the ice is subsequently melted using electrically resistive heating means 36 (see FIG. 6) to accomplish a full cycle according to the principle of operation of the invention. 36 diagrammatically represents electrically resistive heating means along the expansion chamber wall: this is fully shown in FIG. 6.

The thermally expansible liquid 22 is cooled by conducting away heat through the thermal switch 38 into the thermal plate 40. The thermal plate 40 bounds and contains coolant 42 and conducts heat into the coolant 42 flowing within the coolant tank 44. The thermal switch 38 comprises the free end 46 of the reduced section 26 of piston 28 and that blind end 48 of the second bore portion 30' receiving the reduced section 26 within the thermal plate 40 beyond thermally insulative gasket 58. Thermal switching comprises withdrawal of the free end 46 of the reduced section 26 into the thermally insulative gasket 58, where it can no longer transfer heat efficiently relative to the thermal plate 40, and the passing of the free end 46 into the thermal plate 40 when the thermally expansible liquid 22 contracts, each being a function of the cyclical expansion of the first liquid.

The temperature of coolant 42 is periodically or continuously reduced by conventional refrigerating means, which may include natural means, the supply of cool and warmed fluid passing through the coolant lines 50,52, as shown on FIG. 3, thereby providing a constant and replenishable heat sink for completion of one half the thermal actuator cycle, as detailed below. A coolant tank cover 54, preferably provided with one or more vacuum spaces 56, serves to insulate and contain the coolant 42. A thermally insulative gasket 58 minimizes heat leakage from the upper block portion 16 into the thermal plate 40 and through to coolant 42.

The thermally expansible liquid 22, under proper stimulus either of heat loss or gain, expands, developing pressure within the expansion chambers 24, each in turn. That pressure exerted within any given expansion chamber 24 produces force directed against shoulder 32 of the shouldered double acting piston 28. The shouldered double acting piston 28 is forced linearly away from the thermal plate 40, as the chamber expands.

Figure 9:
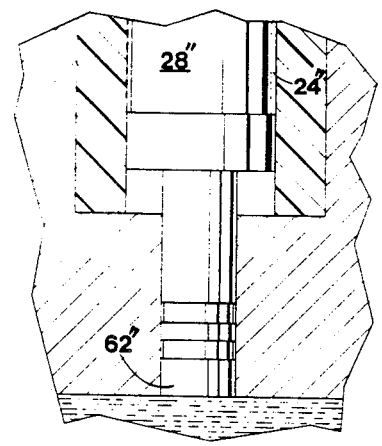
FIG. 9 is a view similar to that of FIG. 8, showing a second alternative embodiment portion.
Figure 8:
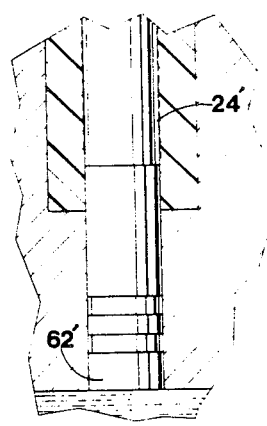
FIG. 8 is a fragmentary, partly sectional detail of an alternative embodiment portion, taken at 8—8, FIG. 6.

The expansion of the thermally expansible liquid 22 produces a linear power stroke, with resulting displacement of the second liquid, hydraulic fluid 60, filling a pan shaped reservoir, one of the hydraulic reservoirs 18, 18', in the housing and bore, by intrusion into the reservoir of a terminal piston face 62, which in this embodiment is the shouldered double acting piston large head 62. The terminal piston face is proportioned for extending into its respective reservoir, and is a portion of the shouldered double acting piston second end, which comprises the shouldered double acting piston 28 from the shoulder 32 to the terminal piston face. The two hydraulic reservoirs, 18 and 18', shown in this embodiment, are each comprised of reservoir pan 64 and that face 66 of the upper block portion 16 adjacent to each reservoir. While this system affords greater economy in fabrication, by employing a plurality of concurrently acting pistons for each reservoir, more conventional hydraulic means, such as a multiplicity of individual hydraulic cylinders, may be employed instead. The maximum transverse dimension of the terminal piston face will vary in relation to the maximum transverse dimension of the transverse face comprising a shoulder 32 on the shouldered double acting piston 28, the former having a maximum transverse dimension equal to, greater than, or less than the maximum transverse dimension of the transverse face, according to the particular application intended for the given embodiment. FIGS. 8 and 9 show such embodiments.

The gasketed plug or end plug 68 and accompanying gasket seal 34 afford the necessary fixed face opposing the shoulder 32 of the shouldered double acting piston 28. The end plug 68 serves also as a guide to the shouldered double acting piston 28 near the thermal switch 38. Each end plug 68 may be provided with a vent hole 70 for escape of air during assembly, before thermally insulative gasket 58 and thermal plate 40 are attached. In the interest of stroke efficiency, the thermally expansible liquid 22 must be all but gas free. A spanner wrench may be used to assemble this plug; for this, holes 72 are shown.

The upper block portion 16 may be fitted with sleeves or liners 74, comprising the outer wall of the expansion chambers 24. The liners 74 should be fabricated of a relatively incompressible material, and should be of relatively low thermal conductivity, the latter enhancing efficiency and shortening the time required to cycle. Additionally, the liners 74 should be fabricated of an electrically insulative material. Acrylic polyester resin is an example of a suitable material.

Figure 7:
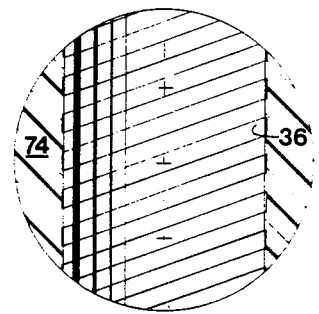
FIG. 7 is an enlarged, fragmentary sectional detail viewed at 7—7, FIG. 6, but with the piston portion removed to show the bore construction.

The previously referred to electrically resistive heating means 36 integral with the liners 74, as more fully detailed in the accompanying description of FIGS. 6 and 7, serve to complete the cycle of thermal expansion and contraction employed in this device.

FIG. 1: Coupling Subsystem 76

Means for coupling the sequentially reciprocating thermal actuators 14 comprise the following. A primary fluid line 78, 78' and bore 80,80' (shown on FIGS. 3,4) couple each of the hydraulic reservoirs 18, 18' (that is the output of the thermal actuators 14) with a corresponding second bore, or one of two small diameter hydraulic cylinders 82. Pressurized fluid forced from a corresponding hydraulic reservoir 18 or 18' fills one of the two small diameter hydraulic cylinders 82, via the aforesaid conduits 78, 78', moving a dual double acting piston 84 by pressure on the smaller diameter portion 86, and thereby displacing a third liquid, hydraulic fluid from the large diameter hydraulic cylinder 88, by pressure of the large head 90 of piston 84. Each dual double acting piston 84 divides a respective bore, the second bore, into a first portion comprising a small diameter hydraulic cylinder 82, and a second portion comprising a large diameter hydraulic cylinder 88. The third liquid from the large diameter hydraulic cylinder 88, under pressurization from the dual double acting piston 84, passes through the communications of the secondary hydraulic circuit 92, powering a turbine of the type disclosed by this inventor in application Ser. No. 338,287 referred to above.

The thermal actuators 14 and 14' detailed would, in this embodiment, act as two groups; all of those at 14 corresponding to a first reservoir 18, and comprising a first means for reciprocating, going through the power stroke in unison, while those at 14' corresponding to a second reservoir 18', and comprising a second means for reciprocating, are retracting under the influences both of contraction of the thermally expansible liquid therein, and refilling of the second reservoir 18', thereby providing alternating reciprocating of the respective pluralities of thermal actuators 14, 14' in cyclical sequence. Each dual double acting piston 84, 84' exerts a power stroke in accompaniment with a corresponding battery of thermal actuators, and each large diameter hydraulic cylinder 88, 88' is refilled in turn, through a fluid return line 94, 94', from fluid passing out of the turbine.

In alternative embodiment, the second liquid, hydraulic fluid from reservoirs 18, 18', may be used to power the turbine directly, conventional coupling being employed as required.

FIG. 1: Output Subsystem 96

The third liquid, fluid from large diameter hydraulic cylinders 88, 88′, provides a means for turning power output means, pressurizing peripheral grooves 98 in the rotor 100 of the turbine system 102, and thereby expanding the chamber formed between each groove face 104 and radial face 106 of corresponding plunger or abutment 108. Respective springs 110 bias the abutments 108 into contact with the grooves 98. The rotor 100 is conventionally mounted on a shaft 112, and power output is through the shaft.

Figure 2:
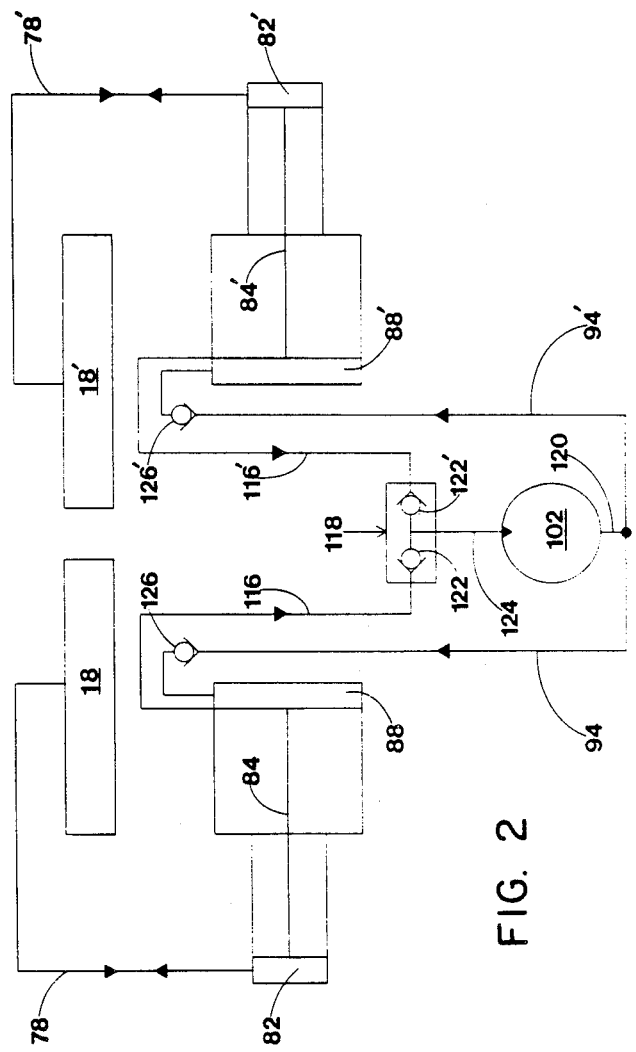
FIG. 2 diagrams a basic system of hydraulic circuitry of the invention.

FIG. 2 discloses a basic plan of hydraulic circuitry. The use of check valves, as indicated, serves to coordinate the flow of pressurized fluid in a simple fashion. Other means to the same end may be employed.

Fluid in any one of the hydraulic reservoirs, as 18, pressurized by a corresponding battery of thermal actuators 14, flows through primary fluid line 78 into the small diameter hydraulic cylinder 82, thereby actuating the dual double acting piston 84. This constitutes a power stroke in a primary hydraulic circuit 114.

The secondary hydraulic circuit 92 is comprised as follows. Fluid forced from first large diameter hydraulic cylinder 88, by actuation of the dual double acting piston 84, flows through turbine feed line 116 and a valve control system 118, through the turbine 102 and out the turbine discharge line 120, then through fluid return line 94′ to second large diameter hydraulic cylinder 88′. The valve control system 118 serves to link both large diameter hydraulic cylinders 88 and 88′ for alternate feeding of the turbine 102. The opposed check valves 122, 122′ of valve control system 118 could be conventionally controlled solenoid valves, and in any event assure that the pressurized line, 116 or 116′ as the case may be, or line feeding the turbine 102, will send fluid through the turbine intake line 124 and turbine 102, while that turbine feed line 116 or 116′ which is not at the moment feeding the turbine, is closed, to prevent backflow of fluid into the second or opposite large diameter hydraulic cylinder, as 88′. This second large diameter hydraulic cylinder 88′ fills with fluid from the turbine discharge line 120 and fluid return line 94′, fluid being admitted through the check valve 126′, while that same fluid is prevented from flowing into the first large diameter hydraulic cylinder 88 by the corresponding check valve 126.

As one large diameter hydraulic cylinder fills, the corresponding dual double acting piston, 84 or 84′, is moved accordingly, displacing fluid from the respective small diameter hydraulic cylinder 82 or 82′. This displaced fluid flows back through the respective primary fluid line 78 or 78′ to refill the corresponding hydraulic reservoir 18 and 18′ (which repositions the shouldered double acting pistons 28 associated with a given reservoir for a subsequent power stroke; see FIG. 1).

It can be seen that the two halves of the hydraulic circuitry may be symmetrical about the turbine, as diagrammed.

Figure 3:
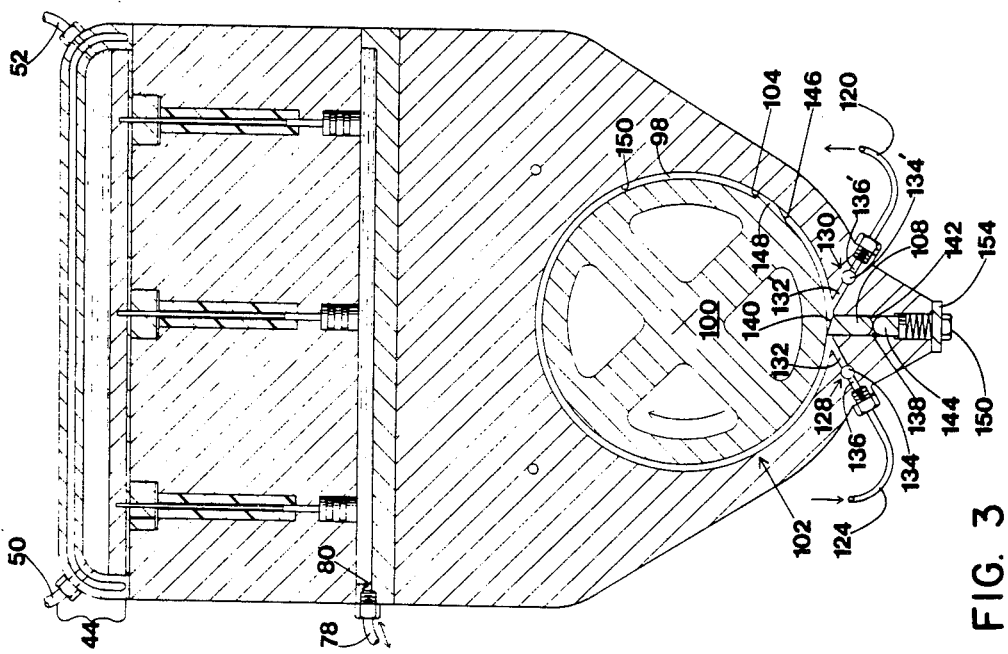
FIG. 3 is an end elevational diagram partly in section, viewed at 3—3, FIG. 1.

FIG. 3 shows details of the turbine 102 along a plane of rotation. A manifold system, comprised of a turbine intake manifold 128 and a turbine discharge manifold 130, may be provided as shown to port the plurality of grooves 98 into common intake and discharge lines on turbine 102. These manifolds correspond to the turbine intake line 124 and turbine discharge line 120 respectively. These manifolds may be comprised, in preferred embodiment, of one groove fluid portal 132, 132′ contiguous with each groove 98 employed, an interconnecting passageway 134, 134′, and a common portal 136, 136′ connecting the interconnecting passageway 134, 134′ to the turbine intake line and turbine discharge line respectively.

A preferred configuration for the plunger or abutment 108 is shown. The abutment 108 is, in transverse section, preferably rectangular, and reciprocates in a plunger passageway 138 of preferably rectangular transverse section. The abutment first end has a bevelled face 140 which rides in the groove 98 and acts as a cam follower. The abutment 108 has a second end which may be a rounded end 142, as shown. The rounded end rides in contact with a plunger keeper 144. This two part construction, comprised of a plunger keeper 144 and the abutment 108, makes for more economical servicing of the turbine 102 when the first ends of the abutments 108 wear.

Groove 98 extends in uniform depth for perhaps 350° around the rotor 100. The first end 104 of the groove 98 has a radial face. The second end 146 of the groove 98 has a cam face outwardly sloped over perhaps 5° of the rotor circumference to a full diameter portion 148 fitting the cylindrical bore 150 in which the rotor 100 rotates. The bevelled first end 140 of abutment 108 rides in cam follower fashion over the second end 146 of the groove 98, after which the trailing edge of the bevelled end 140 of the abutment 108 rides against the outer surface of the rotor 100.

Bolts 152 may be employed at a convenient location to anchor the header strap 154, which serves to retain the springs 110.

The coolant lines 50, 52 may be positioned as shown, passage being provided through the coolant tank cover 54 into the coolant tank 44. A preferred positioning for one of the two primary fluid lines 78, 78′ is also shown.

Figure 4:
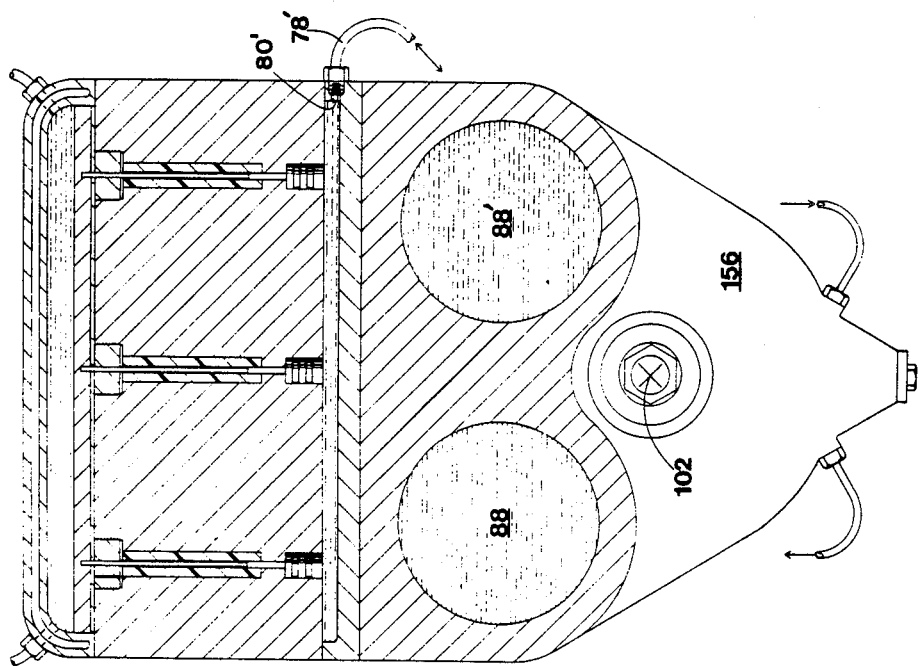
FIG. 4 is an end elevational diagram partly in section, viewed at 4—4, FIG. 1.

FIG. 4 shows the two large diameter hydraulic cylinders 88 and 88′ employed in this embodiment. As is explained earlier, when two such cylinders are used, as is preferred, the one executes a power stroke in turn, sending fluid through the turbine 102, its axis shown, and the other receives the spent fluid. Then the second large diameter hydraulic cylinder, actuated through the coupling means comprised of that portion of the primary hydraulic circuit corresponding to it, on a thermal actuator power stroke, sends pressurized fluid to power the turbine 102 (axis shown), and refill the first large diameter hydraulic cylinder.

A preferred positioning for the second 78′ of two primary fluid lines is also shown.

Lower block 156 may be cast, may be a weldment, or may be fabricated by any other suitable means.

Figure 5:
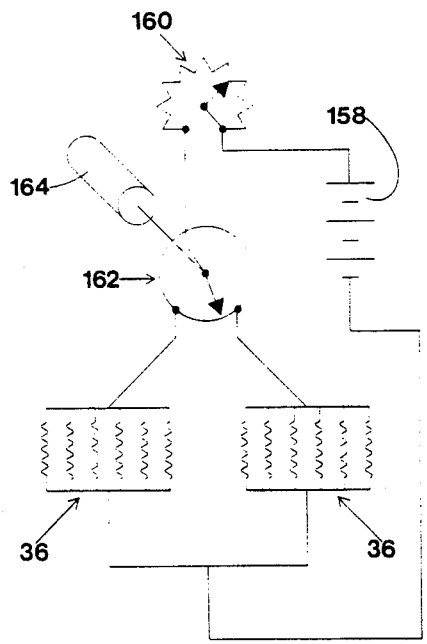
FIG. 5 shows a basic electrical system of the invention.

In FIG. 5 a preferred electrical system is shown, which system is comprised of electrically resistive heating means for warming the thermally expansible liquid 22 (see FIG. 6) within the expansion chambers 24 (see FIG. 1), and controlling means. In preferred embodiment, electricity of any convenient voltage and current, supplied by a conventional power source 158, passes through a rheostat 160, for example. The rheostat regulates the amount of heat provided by the electrically resistive heating means 36. This determines the length of stroke evinced by the thermal actuators 14, facilitating acceleration and deceleration of the system as a whole. The current passes from the rheostat 160 to a time switch 162 driven by a motor 164, or a means of like function. This serves to direct the current to the electrically resistive heating means 36 cyclically, and controls the rate of cyclical function. One battery of expansion chambers 24 (see FIG. 1) is heated, while the others cool. Through the resistive heating means 36, the current warms the thermally expansible liquid 22 (see FIG. 6).

FIG. 6 shows a preferred form of the thermal actuator 14 enlarged, revealing details not otherwise evident. Beginning with the thermal switch 38, it will be noted that the end of the shouldered double acting piston 28 is, in this embodiment, tubular. The free or tubular end 46 may be in contact with the thermal plate 40 at the outside diameter, at the inside diameter and at the end, by means of an aperture or bore 48 in the thermal plate 40 with a cylindrical coaxial spud 166 within the bore 48. The tubular end 46 fits the bore 48 in the thermal plate 40 in sliding, thermally intimate fit. The contact surface area at the thermal switch 38 is thereby greatly increased, and heat may pass off from both the inside and outside surfaces of the shouldered double acting piston 28 into the thermal plate 40. Application of a conventional lubricant with a high degree of thermal conductivity likewise will assist the flow of heat across the thermal switch 38. As the shouldered double acting piston 28 executes the power stroke, withdrawing from the bore 48 provided in the thermal plate 40, or that portion of the housing defining the respective aperture, the surface area over which heat passage may occur diminishes proportionally, conducting less heat away from the first or free end 46 until a point of no contact, and hence no heat passage, is reached. A vacuum then exists in the recessed portion of the thermal plate 40, acting as an insulator.

A piston face of ring shaped cross section, the shoulder 32 on the shouldered double acting piston 28, is the one movable barrier or area against which the expanding liquid within the expansion chamber 24 may exert force. All expansion within the expansion chamber 24 is expressed in a direction perpendicular to the shoulder 32. The shoulder 32 is formed as a substantially transverse face at the junction of a first elongate portion and a second elongate portion of lesser cross section, the first end of the shouldered double acting piston 28 being an extension of the second elongate portion. The area of the shouldered double acting piston 28 in contact with the thermally expansible liquid 22, or first liquid, within the expansion chamber 24, is the transverse face, and the second elongate portion between the shoulder 32 or transverse face and the end seal or gasket 34. The end seal or gasket 34 has a hole in alignment with the second elongate portion, for passage of same therethrough.

The electrically resistive heating means 36, as visualized in this embodiment, are fabricated as parts integral with the liners 74. As shown, a spaced double helix is a most practical arrangement, by virtue both of its ease of fabrication, and tendency to average cold spots in the heater element with warm areas, creating an even effect upon the thermally expansible liquid 22. Positive and negative electrical connections pass in close proximity through the liner 74. Conventional coupling to insulated lead wires 168 run through channel 170 provides power connection. It will be understood that a wire variety of alternative configurations are possible.

In preferred embodiment, the electrically resistive heating means 36 are disposed such that the shouldered double acting piston 28, even when fully retracted, does not make contact with them. However, when the shouldered double acting piston 28 is fabricated of a material with little or no electrical conductivity and which is relatively nonabrasive, such as "Nylon," the electrically resistive heating means 36 may be so situated as to be overlapped by the shouldered double acting piston, this affording a heating surface over the entire length of the expansion chamber 24, even when the expansion chamber is fully expanded.

FIG. 7 shows the hemicylindrical concavity exposed when the overlapping portion of the shouldered double acting piston 28 (see FIG. 6) is removed for exposition. Liner 74 is shown, and also the resistive heating means 36 partly covering the wall of the expansion chamber 24. As shown, the exposed surface of the electrically resistive heating means 36, which may be composed of any conventional electrically resistive material, is best made flush with the wall of the expansion chamber 24. This may be accomplished by cutting a spaced double helix or other suitable pattern into the chamber wall, with a conventional resist first applied to the wall. Then a conductor, such as copper, is electroplated or chemically affixed to the chamber wall in a conventional manner. Alternatively, a ribbon or wire of suitable material may be applied in a conventional manner. As a general principle, the mass of the resistor should be kept as low as possible, as this shortens the cyclic period and increases the efficiency of the thermal actuator 14.

FIG. 8 shows an alternative embodiment in which the expansion chamber 24 is of diameter substantially identical to the shouldered double acting piston large head 62'. The maximum power potential of the expansion chamber 24' is, in part, a function of its outer and inner diameters. The diameter of the shouldered double acting piston large head 62' is one factor involved in determining the potential displacement of the piston. When these two diameters are similar, a unit with a coextensive bore, as shown, provides a suitable configuration.

FIG. 9 shows an embodiment of the invention in which the outer diameter of the expansion chamber 24" is larger than the diameter of the shouldered double acting piston head 62". The bore portions are preferably coaxial, but conform to the dimensions of their respective parts of the shouldered double acting piston 28". This configuration is especially suited, although not limited, to relatively high pressure and high torque applications.

Figure 10:
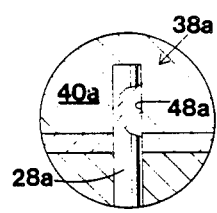
FIG. 10 is a fragmentary, partly sectional detail of an alternative embodiment portion, taken at 10—10, FIG. 6.

FIG. 10 shows an alternative embodiment of the thermal switch 38a, wherein that portion of the shouldered double acting piston 28a which comprises one half of the thermal switch 38a is solid throughout, rather than tubular, with the corresponding bore 48a passing partly through the thermal plate 40a altered to a simple, flat bottomed bore of substantially like dimension. This configuration offers advantage over a tubular design in its ease of fabrication and the greater capacity for heat conduction evinced by the shouldered double acting piston 28a.

It will be understood that gaskets and seals are employed as needed, although not shown, conventional sealing being implied throughout. Likewise, conventional fasteners are employed where ever necessary, while not shown.

This invention is not to be construed as limited to the particular forms disclosed herein, as these are to be regarded as illustrative rather than restrictive. It is to be understood therefore, that the invention may be practiced within the scope of the claims otherwise than as specifically described.

What is claimed and desired to be protected through U.S. Letters Patent is:

1. In a system for generating power, a first subsystem including: a housing (16) having therein a first bore portion (30), a gasket seal (34), an end plug (68), a thermal plate (40), a thermally insulative gasket (58), the first bore portion (30) ending at said gasket seal (34), a second bore portion (30') coaxial with but smaller in diameter than the first bore portion (30) passing through the gasket seal (34) and end plug (68) and thermally insulative gasket (58) and ending in a blind end (48) within the thermal plate (40), a piston (28) having a first end (26) in the form of a uniform diameter reduced portion less in diameter than the first bore portion (30), the first end terminating in a free end (46) and fitting the second bore portion (30') in position for reciprocation of said free end (46) between the thermally insulative gasket (58) and the blind end (48) of the second bore portion (30') in the thermal plate (40), the piston (28) having a portion (28') of larger diameter than said first end (26) and a coaxial shoulder (32) between the first end (26) and the larger diameter portion (28'), a first liquid (22), said first liquid located in said first bore portion (30) around said first end (26) and being thermally expansible between said gasket seal (34) and coaxial shoulder (32) for moving said piston (28) in a first direction, a heater (36) located around said first bore portion (30) for heating said first liquid (22) and moving said piston (28) in a second direction, opposite the first direction, said thermal plated (40) having coolant (42) associated therewith in position for cooling said thermal plate (40) and thereby cooling said first end (26) and first liquid (22) therearound to a greater extent when said free end (46) is in the thermal plate (40) than when said free end (46) is in said thermally insulative gasket (58), a piston head (62) associated with said larger diameter portion (28') of the piston (28), a second liquid (60) in a hydraulic reservoir (18) containing hydraulic fluid (60) in position for displacement by said piston head (62) upon thermal expansion of said first liquid (22), a dual double-acting piston (84) having a smaller diameter portion (86) and a larger diameter portion (90), a third liquid (89) contained at said larger diameter portion (90) of said dual double-acting piston (84), a conduit (78) connecting the hydraulic fluid (60) for actuation of said smaller diameter portion (86) upon said displacement of the hydraulic fluid (60) and thereby actuating said larger diameter portion (90) and displacing said third liquid (89), and a turbine system (102) connected for actuation by said displacement of said third liquid (89).

2. In a system as recited in claim 1, a manifold system (128, 130), the first subsystem connection to said turbine system (102) being through the manifold system (128, 130), a second said subsystem, the second said subsystem connected to said turbine system (102) through the manifold system (128, 130), and means for operating the first subsystem and the second subsystem for pressurizing third fluid (89) in the turbine system (102) in cyclical alternation.

3. In a system as recited in claim 2, the means for operating the first subsystem and the second subsystem including an electrical control system and a hydraulic valving system responsive to the electrical control system.

4. In a system as recited in claim 2, said thermal expansibility of the first liquid (22) comprising the first liquid (22) being thermally expansible upon cooling of the first liquid (22).

5. In a system as recited in claim 2, said thermal expansibility of the first liquid (22) comprising the first liquid (22) being thermally expansible upon heating of the first liquid (22).

6. In a system as recited in claim 2, means for improving heat transfer between the thermal plate (40) and each piston (28) comprising each free end (46) of a piston (28) being a tubular end, and each said blind end (48) of the second bore portion (30') including a spud (166) integral with the thermal plate (40) and extending into a said tubular end.

7. In a system as recited in claim 2, each piston head (62) being larger in diameter than said larger diameter portion (28') of the piston (28).

8. In a system as recited in claim 2, each piston head (62') having a diameter the same as said larger diameter portion (28') of the piston (28).

9. In a system as recited in claim 2, each piston head (62'') being smaller in diameter than said larger diameter portion (28') of the piston (28).

10. In a system as recited in claim 10, a thermally insulative liner (74) in each said first bore portion (30) and each said heater (36) being recessed in a said liner (74) in contact with said first liquid (22).

11. In a system as recited in claim 2, each heater (36) being a spaced double helix of electrically resistive heating material.

* * * * *